United States Patent Office 3,524,916
Patented Aug. 18, 1970

3,524,916
GRISEOFULVIN-ETHYLENE GLYCOL
MONOSALICYLATE COMPOSITIONS
Hiroyuki Mima, Hyogo, Etsunosuke Noda and Toichiro Matsuzaki, Osaka, Masayuki Yamada, Hyogo, and Yoko Nishida, Osaka, Japan, assignors to Takeda Chemical Industries, Ltd., Osaka, Japan
No Drawing. Filed July 6, 1967, Ser. No. 651,392
Claims priority, appplication Japan, July 7, 1966, 41/44,902, 41/44,903
Int. Cl. A61k 21/00
U.S. Cl. 424—285
2 Claims

ABSTRACT OF THE DISCLOSURE

Ethylene glycol monosalicylate is a good solvent for effective amounts of griseofulvin. The resultant compositions, which may be in gel form when a gelation agent is incorporated into the solution, are stable potency-wise and composition-wise for a long period of time. The compositions, as solutions or as gels, are effective in the topical therapy of athlete's foot.

---

This invention relates to a medicinal composition for external application containing griseofulvin as an active ingredient, and to a method for the production of the composition.

Griseofulvin is an antibiotic produced, for example, by means of *Penicillium griseofulvum* Dierck or by *Penicillium jaczewski* Zal. and is known to be effective inter alia in the treatment of athlete's foot.

Heretofore, for the treatment of athlete's foot, griseofulvin has been used only by oral administration, and no griseofulvin-containing composition usable for external application has yet been prepared, since there has been found no solvent or ointment base which effectively dissolves griseofulvin to give a stable solution or composition. On the other hand, the heretofore-used oral administration of griseofulvin is not satisfactory for the treatment of athlete's foot, since the oral administration causes stomach disorder as side effect and the griseofulvin is not sufficiently absorbed through the intestinal canal, and to make the matter worse, griseofulvin absorbed through intestine is distributed uniformiy through the whole body, which inevitably reduced the effectiveness of the griseofulvin in the affected region.

Thus, it has been a desideratum to provide a griseofulvin-containing composition usable for external application.

The principal object of the present invention is to provide a medicinal composition containing griseofulvin as an active ingredient, which can be satisfactorily used for the treatment of athlete's foot by external application.

This object and the aforesaid desideratum are achieved by the present invention, according to which griseofulvin is dissolved in ethylene glycol monosalicylate in concentrations of up to 8 percent (weight/volume) even at about room temperature (15 to 30° C.), with production of an ethylene glycol monosalicylate solution of griseofulvin which is stable for a long period of time without causing any substantial reduction in potency and without precipitation of the griseofulvin.

In accordance with this invention, the concentration of griseofulvin in the ethylene glycol monosalicylate is suitably determined in accordance with the solubilities of griseofulvin in ethylene glycol monosalicylate and the severity of the athlete's foot to be treated, and is generally about 0.1 to about 7 percent, preferably about 0.5 to about 6 percent, by weight relative to the volume of ethylene glycol monosalicylate.

Thus-prepared compositions can be stored for a long period of time without causing precipitation or decomposition of the griseofulvin.

For example, in the following table there is set forth the griseofulvin content of a composition prepared by dissolving 5 weight parts of griseofulvin in 100 volume parts of ethylene glycol monosalicylate, after being stored under various conditions:

| Storage conditions | Griseofulvin content (percent relative to the initial content) | Appearance of the composition |
|---|---|---|
| Just after preparation | 100 | Transparent solution. |
| After storage for 5 hours at 100° C. | 99.1 | Do. |
| After storage for 60 days at 50° C. | 99.7 | Do. |
| After storage for 60 days at 45° C. | 99.8 | Do. |

The composition prepared by dissolving griseofulvin in the ethylene glycol monosalicyclate can be put into practical use as it is for the therapy of athlete's foot by externally applying it to the affected region(s).

In the present invention, the composition can be prepared in gel form by adding a gelation agent to a composition prepared by dissolving griseofulvin in ethylene glycol monosalicylate or by admixing griseofulvin ethylene glycol monosalicylate and a gelation agent. The gel form composition is more effective for the treatment of athlete's foot than the above prepared liquid form mainly because of its good adhesion to an affected region.

The gelation agent is any one which can be dissolved or dispersed in ethylene glycol monosalicylate, and is typically exemplified by dextrine, esters of organic acid (e.g. propylene glycol alginic acid), cellulose derivatives (e.g. methylcellulose, ethylcellulose, carboxymethylcellulose, hydroxyethylcellulose, ethylhydroxyethylcellulose, polyoxyethylenecellulose, etc.), bentonites (e.g. alkylammonium bentonite), lanolin, hydrogenated lanolin, polyoxyethylene derivatives of hydrogenated lanolin, carboxypolymethylene (commercially available as "Carbopol"), polyvinylpyrrolidone, polyvinylalcohol, and a mixture of two or more of these.

The amount of the gelation agent varies with the kind of the agent and the desired solidity of the gel, and is generally about 0.5 to about 20 weight percent relative to the volume of the ethylene glycol monosalicylate. Methylcellulose and polyvinylpyrrolidone are optimally employed for the gelation.

A pharmaceutically acceptable organic solvent can be incorporated into the compositions of the invention (whether in liquid or gel form) in order to reduce the viscosity or solidity thereof.

The organic solvent is exemplified by aliphatic lower alcohol (e.g. methanol, ethanol, propanol, isopropanol), polyhydric alcohol (e.g. propylene glycol), benzene, toluene, ketone (e.g. acetone, methylethylketone), and mixtures of two or more of these. Ethanol, isopropanol, acetone and isopropanol are optimal for the present purpose.

The amount of the solvent varies with desired viscosity or solidity of the composition(s), and generally is about 5 to 45 weight per volume percent relative to the ethylene glycol monosalicylate.

The solvent can be added to the composition in any manner but, when a preparation in liquid form is desired, the solvent is optimally added to the solution of griseofulvin in ethylene glycol monosalicylate and, when a preparation in a gel form is desired, it is optimally added after addition of gelation agent.

In the present composition(s), there may be further incorporated any other active ingredients than griseofulvin. Active ingredients other than griseofulvin are exemplified by sterilizers (e.g. hexachlorophene, benzalkonium chloride, salicylanilide), antibiotics (e.g. neomycine undecylanate), sedatives (e.g. polyoxyethylenelauryl ether), adrenocorticotropic hormones (e.g. cortisone, hydrocortisone). Moreover there can also be incorporated a coloring agent (e.g. Sudan III), chelating agent for heavy metal (e.g. ethylene-diamine tetraacetic acid tetrasodium salt), which is effective for compensating for coloration which may be caused by the presence of a trace iron ion.

Thus-prepared composition(s) of the present invention can be satisfactorily put into use for the effective therapy of athlete's foot, without any undesirable side effect, by externally applying the composition to an affected region.

Throughout the following examples of presently-preferred illustrative embodiments, part(s) are on a weight basis unless otherwise noted, and the relation between part(s) by weight and part(s) by volume correspond to that between gram(s) and milliliter(s).

EXAMPLE 1

Five parts of griseofulvin are added to ethylene glycol monosalicylate so as to make the whole volume 100 parts. The mixture is heated to 80° C. to completely dissolve the griseofulvin and then the solution is cooled by standing in the ambient atmosphere, a transparent liquid composition being obtained.

The composition is stable, retaining its transparency without any substantial reduction in potency of the griseofulvin, even after storage thereof for 360 days at about 25° C.

EXAMPLE 2

80 parts by volume of ethylene glycol monosalicylate are heated to 80° C., and then stirred together with 5 parts of griseofulvin and 0.5 part of hexachlorophene. After having been cooled, the mixture is further mixed with 20 parts by volume of acetone, a transparent composition resulting. The composition has the same stability as that of the composition of Example 1.

EXAMPLE 3

90 parts by volume of ethylene glycol monosalicylate are heated to 80° C. and then stirred together with 5 parts of griseofulvin and 0.1 part of hydrocortisone. After having been cooled, the mixture is further mixed with 0.5 part of neomycin undecylanate dissolved in 7.5 parts by volume of ethyl alcohol, whereby a transparent composition is obtained.

The composition has the same stability as that of the composition of Example 1.

EXAMPLE 4

69.5 parts by volume of ethylene glycol monosalicylate are heated to about 80° C., and then stirred together with 3 parts of griseofulvin, 0.1 part of bromsalicylanilide, 0.5 part of diphenhydramine hydrochloride, 0.001 part of ethylenediaminetetraacetic acid tetrasodium and 2 parts of polyoxyethylenelauryl alcohol ether. After having been cooled, the mixture is further stirred together with 12.5 parts by volume of acetone and 13 parts by volume of ethanol, a transparent composition being obtained.

The composition is stable, retaining its initial gel form without reduction in griseofulvin potency, even after its storage for 360 days at about 25° C.

EXAMPLE 5

Following the procedure of Example 2, transparent compositions are prepared by the use of the following formulations:

Formulation 1:
  Griseofulvin—5 parts
  Methyl alcohol—10 parts by volume
  Ethylene glycol monosalicylate to make 100 parts by volume in total Formulation 2:
  Griseofulvin—5 parts
  Methylethyl ketone—10 parts by volume
  Ethylene glycol monosalicylate to make 100 parts by volume in total Formulation 3:
  Griseofulvin—5 parts
  Methyl isobutyl ketone—10 parts by volume
  Ethylene glycol monosalicylate to make 100 parts by volume in total Formulation 4:
  Griseofulvin—5 parts
  Propyl alcohol—10 parts by volume
  Ethylene glycol monosalicylate to make 100 parts by volume in total Formulation 5:
  Griseofulvin—5 parts
  Isopropyl alcohol—15 parts by volume
  Ethylene glycol monosalicylate to make 100 parts by volume in total These compositions show the same stability as the composition of Example 4.

EXAMPLE 6

Five parts of griseofulvin is added to 92 parts of ethylene glycol monosalicylate, followed by heating at 80° C. to dissolve the latter.

After the solution has been cooled, 3 parts of carboxypolymethylene (Carbopol 934) are stirred dropwise thereinto, a colorless, transparent gel composition being obtained.

The composition shows the same stability as that of Example 4.

EXAMPLE 7

Following the procedure according to Example 6, a colorless and transparent composition is prepared with the following formulation:

Formulation:
  Griseofulvin—2 parts
  Ethylhydroxyethylcellulose—3 parts
  Ethylene glycol monosalicylate to make 100 parts by volume in total The composition shows the same stability as that of Example 4.

EXAMPLE 8

94 parts of ethylene glycol monosalicylate are heated to about 70° C. and then stirred together with 2 parts of griseofulvin, 2 parts of propylene glycol monoalginate and 2 parts of dextrin, a colorless, transparent gel composition being obtained.

EXAMPLE 9

By following the procedure according to Example 6, an opaque and white gel composition is prepared by the use respectively of the following formulations:

Formulation 1:
  Griseofulvin—5 parts
  Dimethyloctadecylammonium bentonite—5 parts
  Ethylene glycol monosalicylate to make 100 parts in total Formulation 2:
  Griseofulvin—5 parts
  Polyoxyethylene cellulose—20 parts
  Ethylene glycol monosalicylate to make 100 parts in total Formulation 3:
  Griseofulvin—3 parts
  Bromsalicylanilide—1 part
  Diphenhydramine hydrochloride—0.5 part
  Polyoxyethylenelaurylalcohol ether—2 parts
  Methyl cellulose—5 parts
  Polyvinylpyrrolidone—1 part Ethylenediaminetetraacetic acid tetrasodium salt 0.015 part
Ethylene glycol monosalicylate to make 100 parts in total Formulation 4:
  Griseofulvin—5 parts
  Ethyl cellulose—5 parts
  Ethylene glycol monosalicylate to make 100 parts in total Formulation 5:
  Griseofulvin—5 parts
  Carboxymethyl cellulose—5 parts
  Ethylene glycol monosalicylate to make 100 parts in total Formulation 6:
  Griseofulvin—5 parts
  Hydroxyethyl cellulose—5 parts
  Ethylene glycol monosalicylate to make 100 parts in total Formulation 7:
  Griseofulvin—5 parts
  Polyvinylalcohol—10 parts
  Ethylene glycol monosalicylate to make 100 parts in total Formulation 8:
  Griseofulvin—5 parts
  Lanolin (anhydrous)—10 parts
  Ethylene glycol monosalicylate to make 100 parts in total Formulation 9:
  Griseofulvin—5 parts
  Hydrogenated lanolin with polyoxy ethylene—5 parts
  Ethylene glycol monosalicylate to make 100 parts in total These compositions show the same stability as the composition of Example 4.

What we claim is:

1. A composition for the external treatment of athlete's foot, which comprises substantially about 0.1 to about 7 weight parts of griseofulvin dissolved in 100 volume parts of ethylene glycol monosalicylate.

2. A composition as claimed in claim 1, wherein the amount of griseofulvin is about 0.5 to about 6 weight parts relative to 100 volume parts of ethylene glycol monosalicylate.

References Cited

UNITED STATES PATENTS

| | | | | |
|---|---|---|---|---|
| 794,982 | 7/1905 | Hofmann | 260— | 474 |
| 2,485,339 | 10/1949 | Van Eijk | 424— | 230 |
| 3,008,876 | 11/1961 | Rhodes | 424— | 285 |

FOREIGN PATENTS

| | | |
|---|---|---|
| 810,377 | 3/1959 | Great Britain. |
| 37–5,924 | 6/1955 | Japan. |

OTHER REFERENCES

Landis, Larry, et al.: Proc. Soc. Exp. Biol., vol. 76, pp. 538–540 (1951).

Remington's Practice of Pharmacy, Martin, Eric, Mack Pub. Co. (1961), p. 180.

Chemical Abstracts, vol. 2, pp. 2705–2706 (1907).

Goldman, Leon, et al.: Acta Derm. Vener., vol. 39, pp. 454–460 (1959).

Husa's Pharm. Disp., Martin, Eric W., Mack Pub. Co., pp. 164–171 (1959).

ALBERT T. MEYERS, Primary Examiner

D. M. STEPHENS, Assistant Examiner

U.S. Cl. X.R.

424—60, 230, 365